Figure 1:
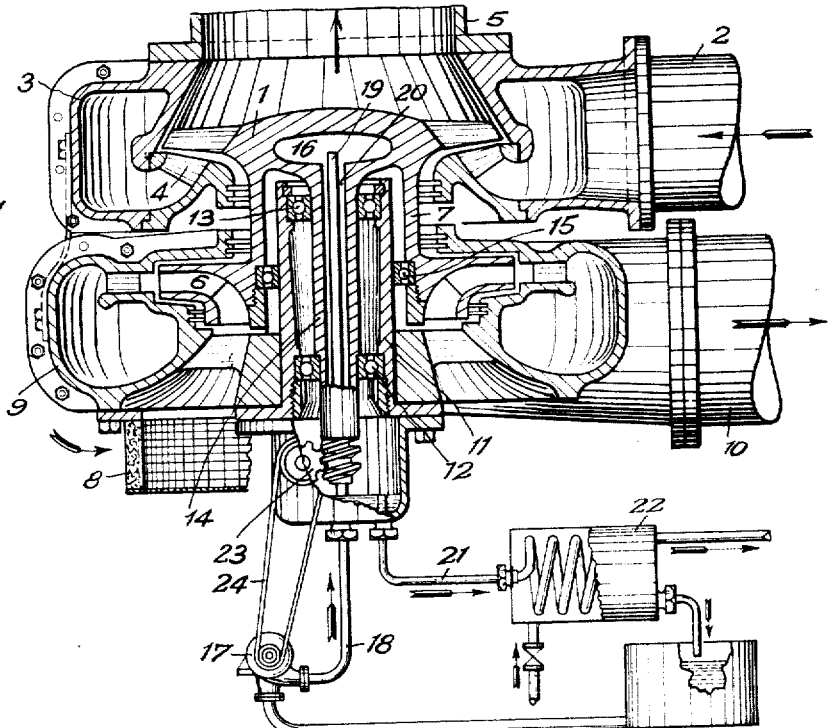

May 23, 1939.  A. BUCHI  2,159,422

GAS TURBINE DRIVEN BLOWER

Filed Nov. 16, 1937  4 Sheets-Sheet 1

Inventor
Alfred Büchi
By Sommers + Young
attys

May 23, 1939.   A. BUCHI   2,159,422
GAS TURBINE DRIVEN BLOWER
Filed Nov. 16, 1937   4 Sheets-Sheet 2

Inventor
Alfred Büchi
By
Sommers & Young
Attys

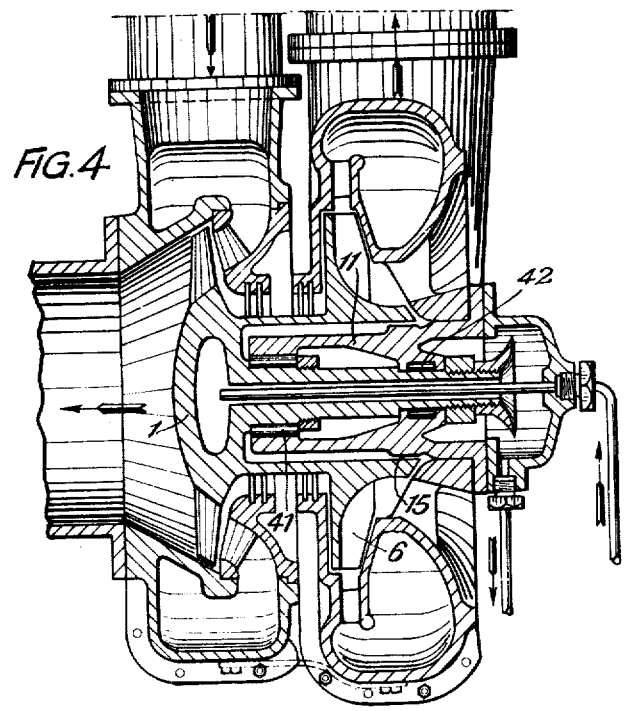
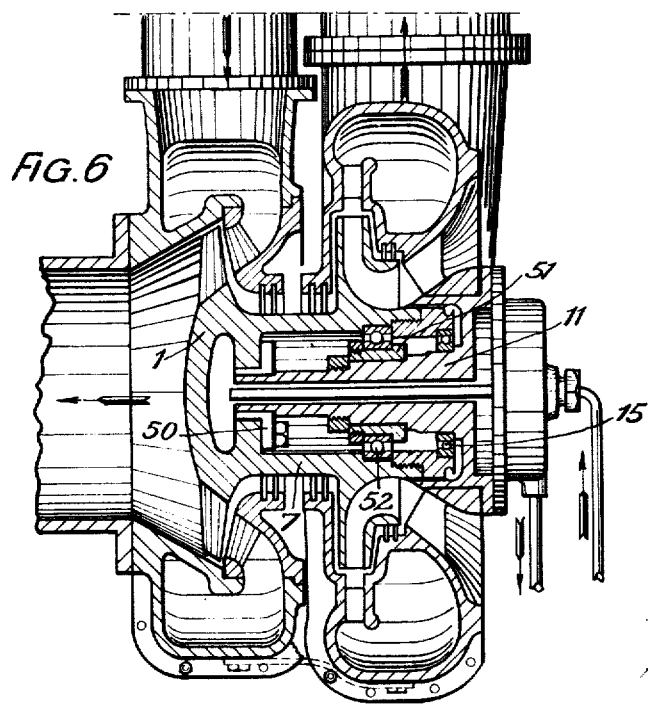

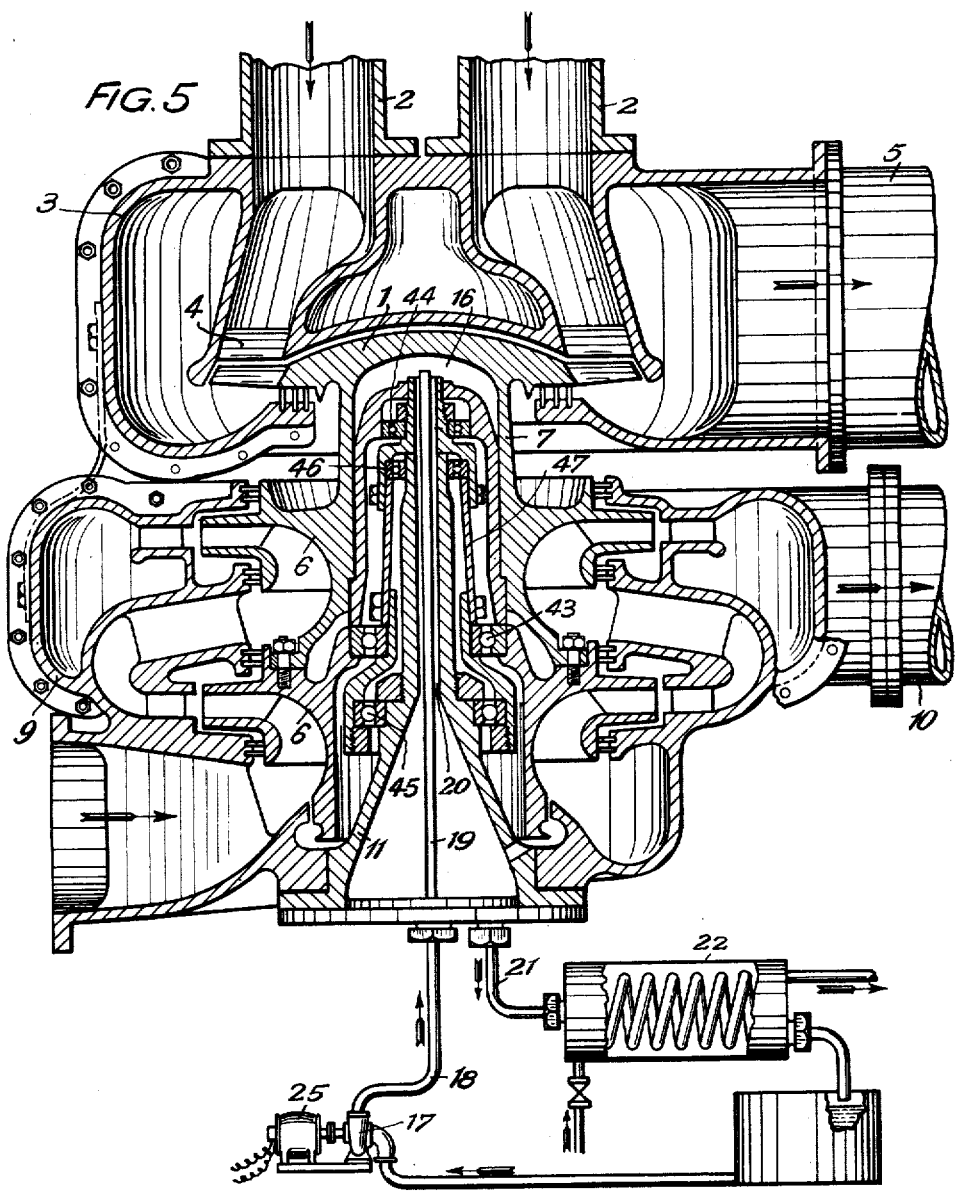

Patented May 23, 1939

2,159,422

UNITED STATES PATENT OFFICE 2,159,422

GAS TURBINE DRIVEN BLOWER

Alfred Buchi, Winterthur, Switzerland

Application November 16, 1937, Serial No. 174,878
In Switzerland November 24, 1936

7 Claims. (Cl. 230—116)

This invention relates to gas turbine driven blowers.

The invention is particularly concerned with the construction of a gas turbine driven blower equipment for use in combination, particularly, with internal combustion engines or other hot gas delivering devices.

The invention consists in that a connecting member between the rotors of the turbine and of the blower is constructed as a hollow shaft which is open at one end, and the diameter of which is such that the bearing arrangement for these rotors can be sustained within this shaft by a bearing support which is supported from outside and projects into the hollow shaft through said open end. This support may either be constructed as a hollow body itself in which a stub shaft connected to the rotor system is rotatably mounted or else the construction of this support may be such that the bearing portions secured in the hollow rotor carrier shaft rotate together with the rotor system about the mating bearing portions secured to the bearing support.

The bearing arrangement may be provided by ordinary shaft bearings, or ball, roller, or needle bearings or combinations thereof. One or more of the bearings, sustained in the annular space between the hollow rotor carrier shaft and the fixed bearing support may be constructed so as to function as bearings, for example, only if the hollow rotor carrier shaft has a side whip, as is the case when turning at or passing through a certain critical speed.

Furthermore, for sustaining the rotor system two or more bearing arrangements may be combined with each other, the construction being such, that by virtue of the same the rolling speeds of the individual bearing arrangements are reduced.

Moreover, either the stub shaft, which is connected to the rotor system and is rotatably mounted in the bearing support, or the bearing support as such may be bored for the purpose of supplying to the turbine rotor a cooling medium or discharging such a medium from the latter. The cooling medium circulating system of the turbine rotor may either be entirely independently arranged or be combined with that of the turbine casing or that of the internal combustion engine.

The invention provides for compact and light weight constructions of the rotor system and the casing parts. Especially the bearings can be approached on each other with its aid so closely that even for critical speeds as great as obtainable the shaft can be made slender and light in weight, in which way, low circumferential speeds and accordingly small frictional losses result at the bearings. Again, by means of the invention, the presence of a bearing within the region of the turbine casing which becomes hot during the operation is avoided.

Figure 2:
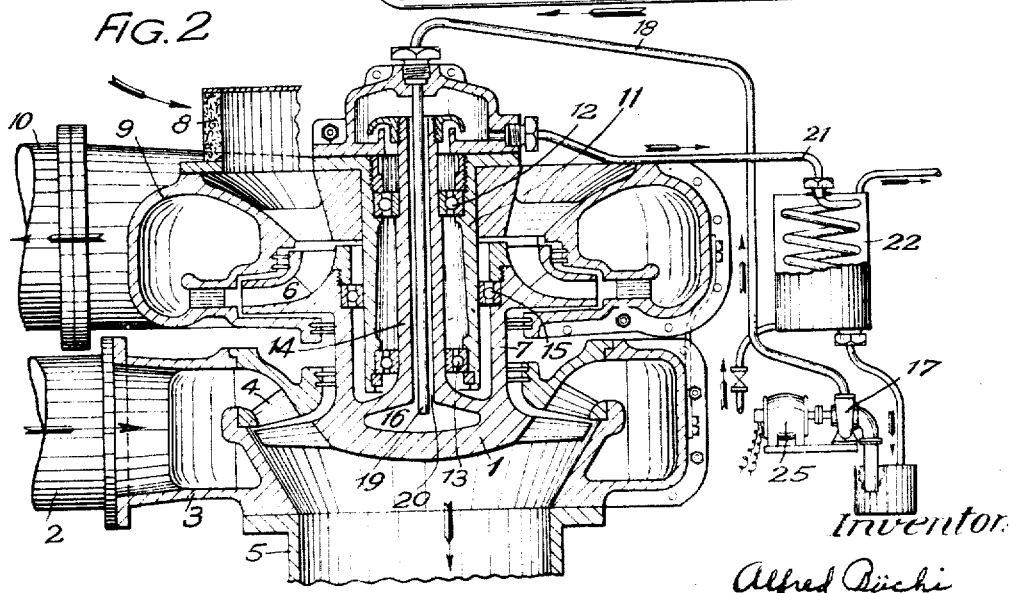
Figure 3:
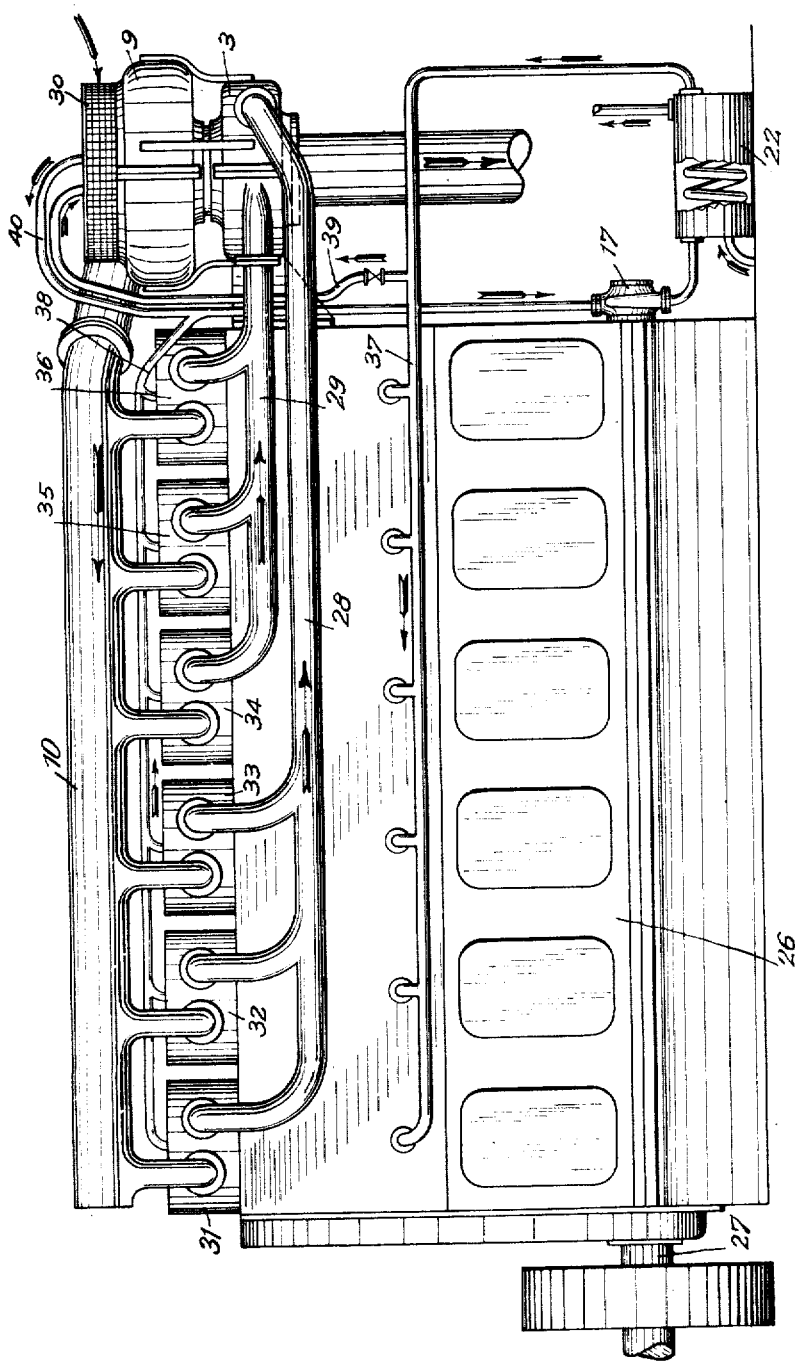

In the accompanying drawings several constructional forms of the invention are illustrated by way of example only, in which Figs. 1 and 2 each show an axial section of a different constructional form of the invention;

Fig. 3 is an elevational organization drawing showing the manner in which the turbo-blower equipment is connected with an internal combustion engine, and Figs. 4, 5 and 6 each show further different constructional forms of the invention.

Like numerals denote like parts throughout the drawings.

In Figs. 1 and 2 two constructional forms of the invention are shown which differ in the respect that in the former case the turbine is arranged above the blower, whereas in the latter case it is arranged below the blower. The turbine rotor 1 is in the form of a single-stage wheel which is running with conical admission. The gases issuing from an internal combustion engine, a fire place or some other heat delivering device pass through a conduit 2 into the turbine casing 3, as indicated by arrows, and are then supplied to the turbine rotor 1 through a nozzle ring 4 from where they discharge from the turbine casing 3 through a waste gas pipe 5. 6 designates the blower rotor which is connected to the turbine rotor 1 by a rotatable hollow shaft 7. The air supply is drawn in through an air-filter 8 in the direction of the arrow shown and is forced into the casing 9 by action of the blower rotor 6 from where the air is passed through a pipe 10, for example, to the cylinders of an internal combustion engine.

A bearing support 11 is secured to the blower casing 9, so that it projects into the hollow shaft 7. In the bearing support 11, which is constructed as a hollow body, a shaft 14 is rotatably mounted by means of two ball bearings 12, 13, the shaft being firmly connected to the turbine rotor 1 and consequently also to the hollow shaft 7 and the blower rotor 6. In the annular space between the hollow rotor carrier shaft 7 and the bearing support 11 a supplemental ball bearing 15 is arranged which is mounted in position with radial play and thus functions as a bearing only when the rotor system does not run true.

The turbine rotor body 1 is provided with a hollow space 16 which is supplied with a cooling medium by a pump 17 through a conduit 18 and a duct 19 inside the shaft 14. The cooling medium leaving the shaft 14 through a separate passage 20 in heated condition is discharged through a conduit 21 and re-cooled in a cooler 22. The drive of the pump 17 may be derived from the rotatable shaft 14 through the intermediary of a worm drive 23 and a belt drive 24, as shown in Fig. 1. Alternatively, the pump may be driven by an external source of power as by an electric motor 25, as shown in Fig. 2.

In Fig. 3, an elevational view of an internal combustion engine 26 is shown which delivers power for external use through the crankshaft 27. The exhaust gases from the engine are led into the exhaust gas turbine 3 through conduits 28, 29. With the turbine is associated a blower 9 which draws in air through an air filter 30 and supplies it to the cylinders 31 to 36 in compressed state through pipe 10. Numeral 17 refers to the cooling medium pump which, in this instance, is driven by the crankshaft 27 of the internal combustion engine 26. From the pump 17 the cooling medium passes through the cooler 22, and is then divided, part passing through a conduit 37 to the combustion cylinders 31 to 36, as indicated by arrows, and from there through a conduit 38 back into the pump 17 and another part passing through a conduit 39 and the turbine shaft (not shown) into the interior of the turbine rotor. From the rotor the cooling medium is also returned to the pump through a pipe 40.

In Fig. 4, a further constructional form of the invention is shown, in an axial section, the turbine rotor 1, the blower rotor 6 and the bearing support 11 being modified. The bearing arrangement within the hollow bearing support includes needle bearings 41, 42, whereas the auxiliary bearing 15 in the exterior annular space is constructed as an ordinary shaft bearing having clearance.

Figs. 5 and 6 show two further constructional forms of the invention, each being an axial section of a gas turbine driven blower equipment all the bearings of which are arranged in the annular space between the fixed bearing support 11 and the rotatable hollow shaft 7. The casing of the exhaust gas driven turbine shown in Fig. 5 is so constructed that the gases stream through the turbine rotor 1 in the opposite direction to that shown in Fig. 1. The blower 9 is of the two-stage type. The fixed bearing carrier 11 has a shape similar to a plug and is surrounded by ball bearings. By way of example, two pairs of ball bearings 43, 44 and 45, 46 are arranged operatively in series with each other by means of an intervening multi-part sleeve 47, bearings 45 and 46 being mounted in spaced longitudinal relationship on support 11, and within sleeve 47, while bearings 43 and 44 are mounted on the exterior of sleeve 47 and support shaft 7 and the rotors from within. By this arrangement the rolling speeds in the individual bearings is reduced. The cooling medium is introduced into the hollow space 16 of the turbine rotor 1 through a central pipe 19 and it leaves the bearing support 11 again through a bore 20 thereof, which surrounds the pipe 19, and through a pipe 21.

In the form of the bearing arrangement shown in Fig. 6, the inner end of the bearing support 11 carries a bearing socket 50 which is fixed to the turbine rotor 1 and turns together with the latter about the correlated stationary bearing surface of the bearing support 11. The bearing support 11 further carries on its outer circumference a bi-part sleeve 51 which acts in the manner of an ordinary bearing bushing and carries in turn the inner race ring of the ball bearing 52. The outer race ring of the bearing 52 turns together with the rotor system. At the open end of the hollow shaft 7 the auxiliary bearing 15 is arranged.

I do not limit myself to the particular size, shape, number or arrangement of parts as shown and described, all of which may be varied without going beyond the scope of my invention as shown, described and claimed.

What I claim is:

1. In a gas turbine driven blower unit, for use with hot gas delivering apparatus, particularly internal combustion engines, a turbine rotor and a blower rotor coaxial with said turbine rotor, said rotors being axially spaced apart from each other throughout their entire extent, a hollow shaft connecting member of relatively small cross-sectional area interconnecting said rotors for transmitting the torque set up therebetween while allowing individual expansion of said rotors independently of each other in any direction but allowing only relatively small heat transfer to take place from the turbine side of the blower side, said shaft having a freely accessible open end adjacent the relatively cool blower rotor, a bearing for said rotor system, and a bearing support projecting into said hollow connecting member through said open end for sustaining said bearing arrangement within said connecting member by supporting said bearing from outside said hollow shaft connecting member.

2. In a gas turbine driven blower equipment, for hot gas delivering devices, particularly internal combustion engines, turbine rotor means and blower rotor means, a connecting member similar to a hollow shaft for said rotor means forming a unitary system with said rotors and having an open end, a bearing arrangement for said rotor system, a hollow bearing support projecting into said connecting member through said open end for sustaining said bearing arrangement within said member by supporting said arrangement from a fixed exterior point, a stub shaft fixed to said turbine rotor means adjacent the end of said connecting member adjoining said turbine rotor means for common rotation with the latter and extending into the hollow interior of said bearing support, and at least one bearing revolubly guiding said stub shaft in said support.

3. In a gas turbine driven blower unit, for use with hot gas delivering apparatus, particularly internal combustion engines, a turbine rotor and a blower rotor coaxial with said turbine rotor, said rotors being axially spaced apart from each other, a hollow shaft connecting member of relatively small diameter interconnecting said rotors for transmitting the torque set up therebetween while allowing individual expansion of said rotors independently of each other but allowing only relatively small heat transmission from the turbine side to the blower side, and having a freely accessible open end adjacent the relatively cool blower rotor, a bearing support projecting into the hollow of said connecting member through said open end, and roller bearing means intercalated between said bearing support and said hollow shaft connecting member, said bearing support sustaining said roller bearing means within said relatively cool hollow of said connecting member from a point outside said hollow shaft connecting member.

4. In a gas turbine driven blower equipment, for hot gas delivering devices, particularly for internal combustion engines, turbine rotor means and blower rotor means, a connecting member similar to a hollow shaft for said rotor means forming a unitary system therewith and having an open end, a bearing arrangement for said rotor system, a bearing support projecting into said connecting member through said open end and leaving an intervening annular space between it and said member, for sustaining said bearing arrangement within said member by supporting said arrangement from a fixed point from outside, and an auxiliary bearing of a construction arranged in said annular space as to act as a bearing in cases only where said hollow connecting member for said rotor system has a side whip.

5. In a gas turbine driven blower equipment, for hot gas delivering devices, particularly for internal combustion engines, turbine rotor means and blower rotor means, a connecting member similar to a hollow shaft for said rotor means forming a unitary system with said rotors and having an open end, a bearing arrangement for said rotor system including at least two bearing systems having bearing elements, and a floating sleeve interposed between said bearing systems to provide for reducing the operating speeds in the individual bearings of said arrangement; and a bearing support projecting into said connecting member through said open end for sustaining said bearing arrangement within said member by supporting said arrangement from outside.

6. In a gas turbine driven blower equipment, for hot gas delivering devices, particularly for internal combustion engines, turbine rotor means and blower rotor means, a connecting member similar to a hollow shaft for said rotor means forming a unitary system therewith and having an open end, a bearing arrangement for said rotor system, a hollow bearing support projecting into said connecting member through said open end for sustaining said bearing arrangement within said member by supporting said arrangement from outside, a hollow stub shaft starting from the end of said connecting member adjacent to said turbine rotor means and extending into the hollow interior of said bearing support, cooling medium conduction spaces provided inside said hollow stub shaft for supplying and discharging said medium to and from said turbine rotor means, and at least one bearing revolubly guiding said stub shaft in said support.

7. In a gas turbine driven blower equipment for hot gas delivering devices, particularly for internal combustion engines, turbine rotor means and blower rotor means, a connecting member similar to a hollow shaft for said rotor means forming a unitary system therewith and having an open end, a bearing arrangement for said rotor system, a centrally bored bearing support projecting with its bore concentrically into said connecting member through said open end for sustaining said bearing arrangement within said member by supporting said arrangement from a fixed point from outside, and cooling medium conduction spaces provided inside said bore and said externally fixed bearing support for supplying and discharging said medium to and from said turbine rotor means.

ALFRED BUCHI.

---

CERTIFICATE OF CORRECTION.

Patent No. 2,159,422.   May 23, 1939.

ALFRED BUCHI.

It is hereby certified that error appears in the printed specification of the above numbered patent requiring correction as follows: Page 2, second column, line 28, claim 1, for the word "of" read to; and that the said Letters Patent should be read with this correction therein that the same may conform to the record of the case in the Patent Office.

Signed and sealed this 1st day of August, A. D. 1939.

(Seal)

Henry Van Arsdale,
Acting Commissioner of Patents.

necting member from a point outside said hollow shaft connecting member.

4. In a gas turbine driven blower equipment, for hot gas delivering devices, particularly for internal combustion engines, turbine rotor means and blower rotor means, a connecting member similar to a hollow shaft for said rotor means forming a unitary system therewith and having an open end, a bearing arrangement for said rotor system, a bearing support projecting into said connecting member through said open end and leaving an intervening annular space between it and said member, for sustaining said bearing arrangement within said member by supporting said arrangement from a fixed point from outside, and an auxiliary bearing of a construction arranged in said annular space as to act as a bearing in cases only where said hollow connecting member for said rotor system has a side whip.

5. In a gas turbine driven blower equipment, for hot gas delivering devices, particularly for internal combustion engines, turbine rotor means and blower rotor means, a connecting member similar to a hollow shaft for said rotor means forming a unitary system with said rotors and having an open end, a bearing arrangement for said rotor system including at least two bearing systems having bearing elements, and a floating sleeve interposed between said bearing systems to provide for reducing the operating speeds in the individual bearings of said arrangement; and a bearing support projecting into said connecting member through said open end for sustaining said bearing arrangement within said member by supporting said arrangement from outside.

6. In a gas turbine driven blower equipment, for hot gas delivering devices, particularly for internal combustion engines, turbine rotor means and blower rotor means, a connecting member similar to a hollow shaft for said rotor means forming a unitary system therewith and having an open end, a bearing arrangement for said rotor system, a hollow bearing support projecting into said connecting member through said open end for sustaining said bearing arrangement within said member by supporting said arrangement from outside, a hollow stub shaft starting from the end of said connecting member adjacent to said turbine rotor means and extending into the hollow interior of said bearing support, cooling medium conduction spaces provided inside said hollow stub shaft for supplying and discharging said medium to and from said turbine rotor means, and at least one bearing revolubly guiding said stub shaft in said support.

7. In a gas turbine driven blower equipment for hot gas delivering devices, particularly for internal combustion engines, turbine rotor means and blower rotor means, a connecting member similar to a hollow shaft for said rotor means forming a unitary system therewith and having an open end, a bearing arrangement for said rotor system, a centrally bored bearing support projecting with its bore concentrically into said connecting member through said open end for sustaining said bearing arrangement within said member by supporting said arrangement from a fixed point from outside, and cooling medium conduction spaces provided inside said bore and said externally fixed bearing support for supplying and discharging said medium to and from said turbine rotor means.

ALFRED BUCHI.

---

CERTIFICATE OF CORRECTION.

Patent No. 2,159,422.　　　　　　　　　　May 23, 1939.

ALFRED BUCHI.

It is hereby certified that error appears in the printed specification of the above numbered patent requiring correction as follows: Page 2, second column, line 28, claim 1, for the word "of" read to; and that the said Letters Patent should be read with this correction therein that the same may conform to the record of the case in the Patent Office.

Signed and sealed this 1st day of August, A. D. 1939.

(Seal)

Henry Van Arsdale,
Acting Commissioner of Patents.